(12) United States Patent
Kuchibhotla et al.

(10) Patent No.: US 8,271,417 B2
(45) Date of Patent: Sep. 18, 2012

(54) HEALTH METER

(75) Inventors: Balasubrahmanyam Kuchibhotla, San Ramon, CA (US); Karl Dias, Foster City, CA (US); Jonathan Klein, Redwood City, CA (US); Gary Ngai, Saratoga, CA (US); Mark Ramacher, San Carlos, CA (US); Leng Tan, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 760 days.

(21) Appl. No.: 12/252,070

(22) Filed: Oct. 15, 2008

(65) Prior Publication Data

US 2009/0106180 A1   Apr. 23, 2009

Related U.S. Application Data

(60) Provisional application No. 60/981,456, filed on Oct. 19, 2007.

(51) Int. Cl.
*G06F 17/00* (2006.01)
*G06N 5/02* (2006.01)

(52) U.S. Cl. ......................................... 706/47
(58) Field of Classification Search ............... 706/47
See application file for complete search history.

(56) References Cited

U.S. PATENT DOCUMENTS

| | | | |
|---|---|---|---|
| 4,866,635 A | 9/1989 | Kahn et al. | |
| 5,067,099 A | 11/1991 | McCown et al. | |
| 5,123,017 A | 6/1992 | Simpkins et al. | |
| 5,309,448 A | 5/1994 | Bouloutas et al. | |
| 5,845,272 A | 12/1998 | Morjaria et al. | |
| 5,920,489 A | 7/1999 | Dibrino et al. | |
| 5,922,079 A | 7/1999 | Booth et al. | |
| 5,968,122 A | 10/1999 | Schlosser et al. | |
| 6,012,152 A | 1/2000 | Douik et al. | |
| 6,125,311 A | 9/2000 | Lo | |
| 6,182,249 B1 | 1/2001 | Wookey et al. | |
| 6,208,955 B1 | 3/2001 | Provan et al. | |
| 6,237,114 B1 | 5/2001 | Wookey et al. | |
| 6,243,628 B1 | 6/2001 | Bliley et al. | |
| 6,349,335 B1 | 2/2002 | Jenney | |
| 6,434,512 B1 | 8/2002 | Discenzo | |
| 6,519,552 B1 | 2/2003 | Sampath et al. | |

(Continued)

FOREIGN PATENT DOCUMENTS

EP   633536 A1   1/1995

OTHER PUBLICATIONS

Non-Final Office Action for U.S. Appl. No. 12/485,759 mailed on Dec. 21, 2010; 21 pages.

(Continued)

*Primary Examiner* — Michael B Holmes
(74) *Attorney, Agent, or Firm* — Kilpatrick Townsend & Stockton LLP

(57) ABSTRACT

Techniques for indicating the status or health of a software system in a simple and summarized manner. In one embodiment, a health meter is displayed that displays a status value indicating the status or health of the software system. The status or health of the system as indicated by the health meter may be based upon one or more characteristics or perspectives (or components) of the system, such as performance, resource utilization, reliability, availability, scalability, and status values computed for the components.

20 Claims, 9 Drawing Sheets

U.S. PATENT DOCUMENTS

| | | | |
|---|---|---|---|
| 6,535,865 B1 | 3/2003 | Skaaning et al. | |
| 6,539,337 B1 | 3/2003 | Provan et al. | |
| 6,574,717 B1 * | 6/2003 | Ngai et al. | 711/147 |
| 6,604,141 B1 | 8/2003 | Ventura | |
| 6,615,090 B1 | 9/2003 | Blevins et al. | |
| 6,633,782 B1 | 10/2003 | Schleiss et al. | |
| 6,665,425 B1 | 12/2003 | Sampath et al. | |
| 6,681,215 B2 | 1/2004 | Jammu | |
| 6,697,810 B2 | 2/2004 | Kumar et al. | |
| 6,697,962 B1 | 2/2004 | McCrory et al. | |
| 6,738,811 B1 | 5/2004 | Liang | |
| 6,782,345 B1 | 8/2004 | Siegel et al. | |
| 6,862,698 B1 | 3/2005 | Shyu | |
| 6,892,317 B1 | 5/2005 | Sampath et al. | |
| 6,910,000 B1 | 6/2005 | Yedidia et al. | |
| 6,915,128 B1 | 7/2005 | Oh | |
| 6,944,800 B2 | 9/2005 | Brundridge et al. | |
| 6,983,200 B2 | 1/2006 | Bodin et al. | |
| 6,985,901 B1 | 1/2006 | Sachse et al. | |
| 7,047,386 B1 * | 5/2006 | Ngai et al. | 711/170 |
| 7,062,749 B2 | 6/2006 | Cyr et al. | |
| 7,096,387 B2 | 8/2006 | Durrant et al. | |
| 7,113,988 B2 | 9/2006 | Chirashnya et al. | |
| 7,124,328 B2 | 10/2006 | Bowers et al. | |
| 7,165,190 B1 | 1/2007 | Srivastava et al. | |
| 7,177,769 B2 * | 2/2007 | Larsson et al. | 702/45 |
| 7,257,744 B2 | 8/2007 | Sabet et al. | |
| 7,281,040 B1 | 10/2007 | Ly | |
| 7,281,170 B2 | 10/2007 | Taylor et al. | |
| 7,308,385 B2 | 12/2007 | Wegerich et al. | |
| 7,313,735 B1 | 12/2007 | Levergood et al. | |
| 7,500,143 B2 | 3/2009 | Buia et al. | |
| 7,525,910 B2 | 4/2009 | Wen | |
| 7,546,222 B2 | 6/2009 | Chintalapti et al. | |
| 7,577,872 B2 | 8/2009 | DiBartolomeo et al. | |
| 7,603,674 B2 | 10/2009 | Cyr et al. | |
| 7,668,953 B1 | 2/2010 | Sinclair et al. | |
| 7,802,144 B2 | 9/2010 | Vinberg et al. | |
| 7,937,623 B2 * | 5/2011 | Ramacher et al. | 714/37 |
| 7,941,707 B2 * | 5/2011 | Sarig et al. | 714/47.1 |
| 7,954,090 B1 | 5/2011 | Qureshi et al. | |
| 8,032,625 B2 | 10/2011 | Benfield et al. | |
| 8,074,103 B2 * | 12/2011 | Dilman et al. | 714/6.1 |
| 2003/0033559 A1 | 2/2003 | Williams | |
| 2003/0074607 A1 | 4/2003 | Brundridge et al. | |
| 2004/0078683 A1 | 4/2004 | Buia et al. | |
| 2004/0078695 A1 | 4/2004 | Bowers et al. | |
| 2004/0078727 A1 | 4/2004 | Little et al. | |
| 2004/0153429 A1 | 8/2004 | Horn et al. | |
| 2004/0193956 A1 | 9/2004 | Greenlee et al. | |
| 2005/0102567 A1 | 5/2005 | McGuire et al. | |
| 2005/0120273 A1 | 6/2005 | Hudson et al. | |
| 2005/0160325 A1 | 7/2005 | Ogino et al. | |
| 2005/0210331 A1 | 9/2005 | Connelly et al. | |
| 2005/0228880 A1 | 10/2005 | Champlin | |
| 2006/0150156 A1 | 7/2006 | Cyr et al. | |
| 2006/0200711 A1 | 9/2006 | Schondelmayer et al. | |
| 2006/0256727 A1 | 11/2006 | Acharya et al. | |
| 2007/0021966 A1 | 1/2007 | Ellefson et al. | |
| 2007/0283329 A1 | 12/2007 | Caprihan et al. | |
| 2007/0294003 A1 | 12/2007 | Underdal et al. | |
| 2008/0065706 A1 | 3/2008 | Miller et al. | |
| 2008/0109796 A1 | 5/2008 | Kosche | |
| 2008/0125877 A1 | 5/2008 | Miller et al. | |
| 2008/0133978 A1 | 6/2008 | Angamuthu et al. | |
| 2008/0141072 A1 | 6/2008 | Kalgren et al. | |
| 2008/0189488 A1 | 8/2008 | DeWitt et al. | |
| 2008/0208784 A1 | 8/2008 | Hill et al. | |
| 2008/0208787 A1 | 8/2008 | Luchene | |
| 2008/0255885 A1 | 10/2008 | Eisenberger et al. | |
| 2008/0263399 A1 | 10/2008 | Cousin et al. | |
| 2008/0282095 A1 | 11/2008 | Haider et al. | |
| 2008/0297375 A1 | 12/2008 | Khuzadi | |
| 2009/0028055 A1 | 1/2009 | Zaencker et al. | |
| 2009/0083576 A1 | 3/2009 | Vlassova et al. | |
| 2009/0105982 A1 | 4/2009 | Sarig et al. | |
| 2009/0105989 A1 | 4/2009 | Ramacher et al. | |
| 2009/0105991 A1 | 4/2009 | Ramacher et al. | |
| 2009/0106262 A1 | 4/2009 | Fallen et al. | |
| 2009/0106278 A1 | 4/2009 | Ramacher et al. | |
| 2009/0106363 A1 | 4/2009 | Fallen et al. | |
| 2009/0106589 A1 | 4/2009 | Ramacher et al. | |
| 2009/0106595 A1 | 4/2009 | Sarig et al. | |
| 2009/0106596 A1 | 4/2009 | Fallen et al. | |
| 2009/0106601 A1 | 4/2009 | Ngai et al. | |
| 2009/0106605 A1 | 4/2009 | Kuchibhotla et al. | |
| 2009/0327815 A1 | 12/2009 | Sridharan et al. | |
| 2010/0100778 A1 | 4/2010 | Sullivan | |
| 2010/0257410 A1 | 10/2010 | Cottrell et al. | |
| 2010/0318847 A1 | 12/2010 | Beg et al. | |
| 2010/0318853 A1 | 12/2010 | Beg et al. | |
| 2010/0318855 A1 | 12/2010 | Beg et al. | |
| 2011/0153540 A1 | 6/2011 | Beg et al. | |

OTHER PUBLICATIONS

Non-Final Office Action for U.S. Appl. No. 12/485,766 mailed on Jan. 25, 2011; 20 pages.

Non-Final Office Action for U.S. Appl. No. 12/251,661 mailed on Nov. 10, 2010; 20 pages.

Notice of Allowance for U.S. Appl. No. 12/251,671 mailed on Jan. 5, 2011, 6 pages.

Final Office Action for U.S. Appl. No. 12/251,700 mailed on Dec. 29, 2010; 14 pages.

Non-Final Office Action for U.S. Appl. No. 12/251,711 mailed on Nov. 9, 2010; 18 pages.

Non-Final Office Action for U.S. Appl. No. 12/251,743 mailed on Dec. 14, 2010; 21 pages.

Notice of Allowance for U.S. Appl. No. 12/252,056 mailed on Jan. 6, 2011; 6 pages.

Non-Final Office Action for U.S. Appl. No. 12/252,128 mailed on Dec. 23, 2010; 19 pages.

Alexandru, M., et al., "An architectural system solution for technical diagnosis," pp. TuD5-17-TuD5-22, International Society of Information Fusion (ISIF), Copyright 2000. [Can also be found in Information Fusion 2000, Jul. 10-13, 2000, vol. 1.].

U.S. Appl. No. 12/485,759, filed Jun. 16, 2009, Beg et al.
U.S. Appl. No. 12/485,763, filed Jun. 16, 2009, Beg et al.
U.S. Appl. No. 12/485,766, filed Jun. 16, 2009, Beg et al.
U.S. Appl. No. 12/641,038, filed Dec. 17, 2009, Beg et al.

Avin, C., et al., "Identifiability of Path-Specific Effects," UCLA Cognitive Systems Laboratory, Technical Report R-321 of Jun. 2005, in Proceedings of the 19th International Joint Conference on Artificial Intelligence, Edinburgh, Scotland, Aug. 2005, 7 pages.

Haicheng, W., et al., "Research on the Function Model of Distributed Intelligent Monitoring and Diagnosis System Based on Multi-Agent," in Electronic Measurement and Instruments, 2007, The Eighth International Conference on Electronic Measurement and Instruments, ICEMI 2007, pp. 3-393-3-396, Copyright 2007 IEEE.

Halpern, J. Y., et al., "Causes and Explanations: A Structural-Model Approach—Part I: Causes," Technical Report R-266-UAI of Jun. 2001, in Proceedings of the Seventeenth Conference on Uncertainty in Artificial Intelligence, San Francisco, CA, 2001, pp. 194-202. [Can also be found in British Journal of Philosophy of Science, vol. 56, 2005, pp. 843-887.].

Halpern, J. Y., et al., "Causes and Explanations: A Structural-Model Approach—Part II: Explanations," Technical Report R-266-IJCAI of Jun. 2001, in Proceedings of the Seventeenth International Joint Conference on Artificial Intelligence (IJCAI), San Francisco, CA, 2001, 8 pages. [Can also be found in British Journal of Philosophy of Science, vol. 56, 2005, pp. 889-911.].

Jongsawat, N., et al., "Dynamic Data Feed to Bayesian Network Model and SMILE Web Application," in Ninth ACIS International Conference on Software Engineering, Artificial Intelligence, Networking, and Parallel/Distributed Computing, pp. 931-936, Copyright 2008 IEEE.

Morjaria, M., et al., "Monitoring Complex Systems with Causal Networks," IEEE Computational Science & Engineering, vol. 3, Issue 4, Winter 1996, pp. 9-10.

Nielsen, U. H., et al., "Explanation Trees for Causal Bayesian Networks," 8 pages. [Can also be found in Proceedings of the 24th Annual Conference on Uncertainty in Artificial Intelligence (UAI-08), 2008, pp. 427-434.].

Pearl, J., "Causal Diagrams for Empirical Research (With Discussions)," Technical Report R-218-B, Biometrika, vol. 82, No. 4, 1995, pp. 669-710, printed in Great Britain.

Pearl, J., "Causal Inference in Statistics: An Overview," Technical Report R-350 of Sep. 2009, Statistics Surveys, vol. 3, 2009, pp. 96-146.

Pearl, J., "Direct and Indirect Effects," Technical Report R-273-UAI of Jun. 2001, In Proceedings of the Seventeenth Conference on Uncertainty in Artificial Intelligence, San Francisco, CA, 2001, pp. 411-420.

Pearl, J., "Robustness of Causal Claims," Technical Report R-320 of Mar. 2004, Submitted to the 20$^{th}$ Conference on Uncertainty in Artificial Intelligence, Banff, Canada, Jul. 2004, 8 pages. [Can also be found In Proceedings of the 20$^{th}$ Conference on Uncertainty in Artificial Intelligence, AUAI Press, Arlington, VA, Jul. 2004, pp. 446-453.].

Pearl, J., "Simpson's Paradox: An Anatomy," Technical Report R-264, Extracted from Chapter 6 of Causality, Apr. 1999, pp. 1-11.

Pearl, J., "Statistics and Causal Inference: A Review," Test Journal, vol. 12, No. 2, Dec. 2003, pp. 281-345.

Pearl, J., "The Logic of Counterfactuals in Causal Inference (Discussion of 'Causal Inference without Counterfactuals' by A.P. Dawid)," Technical Report R-269 of Apr. 2000, in Journal of American Statistical Association, vol. 95, No. 450, Jun. 2000, pp. 428-435.

Tian, J., et al., "A General Identification Condition for Causal Effects," Technical Report R-290-A of Aug. 2002, in Proceedings of the Eighteenth National Conference on Artificial Intelligence, AAAI Press/The MIT Press: Menlo Park, CA, Aug. 2002, pp. 567-573.

Tian, J., et al., "Probabilities of Causation: Bounds and Identification," Technical Report R-271-A of Feb. 2000, in Annals of Mathematics and Artificial Intelligence, vol. 28, 2000, pp. 287-313.

Uraikul, V., "Artificial Intelligence for Monitoring and Supervisory Control of Process Systems," Science Direct, in Engineering Applications of Artificial Intelligence, vol. 20, Issue 2, Mar. 2007, 17 pages (pp. 115-131 in publication), Copyright 2006 Elsevier Ltd.

Yu, J., et al., "Intelligent Monitoring and Diagnosis of Manufacturing Processes Using an Integrated Approach of KBANN and GA," Science Direct, in Computers in Industry, vol. 59, Issue 5, May 2008, 13 pages (pp. 489-501 in publication), Copyright 2007 Elsevier B.V.

Zhang, D., et al., "Researches and Application of a Hybrid Fault Diagnosis Expert System," Proceedings of the 3$^{rd}$ World Congress on Intelligent Control and Automation, Jun. 28-Jul. 2, 2000, Hefei, P.R. China, pp. 215-219, Copyright 2000 IEEE.

Non-Final Office Action for U.S. Appl. No. 12/251,671 mailed on Sep. 17, 2010; 13 pages.

Non-Final Office Action for U.S. Appl. No. 12/251,700 mailed on Jul. 19, 2010; 16 pages.

Non-Final Office Action for U.S. Appl. No. 12/252,056 mailed on Sep. 21, 2010; 17 pages.

Notice of Allowance for U.S. Appl. No. 12/251,700 mailed on Sep. 30, 2011, 10 pages.

Final Office Action for U.S. Appl. No. 12/251,731 mailed on Sep. 23, 2011, 23 pages.

Notice of Allowance for U.S. Appl. No. 12/251,667 mailed on Sep. 20, 2011, 9 pages.

Non-Final Office Action for U.S. Appl. No. 12/251,648 mailed on Sep. 20, 2011, 25 pages.

Final Office Action for U.S. Appl. No. 12/252,128 mailed on Aug. 12, 2011, 10 pages.

Notice of Allowance for U.S. Appl. No. 12/251,711 mailed on Aug. 11, 2011, 1 page.

Notice of Allowance for U.S. Appl. No. 12/485,766 mailed on Aug. 10, 2011, 1 page.

Final Office Action for U.S. Appl. No. 12/485,759 mailed on Aug. 8, 2011, 12 pages.

Non-Final Office Action for U.S. Appl. No. 12/251,743 mailed on Jul. 19, 2011, 11 pages.

Final Office Action for U.S. Appl. No. 12/251,661 mailed on Jun. 8, 2011, 15 pages.

Non-Final Office Action for U.S. Appl. No. 12/251,685 mailed on May 31, 2011, 9 pages.

Final Office Action for U.S. Appl. No. 12/251,711 mailed on May 19, 2011, 6 pages.

Non-Final Office Action for U.S. Appl. No. 12/251,731 mailed on Mar. 2, 2011, 26 pages.

Non-Final Office Action for U.S. Appl. No. 12/251,667 mailed on Mar. 1, 2011, 14 pages.

Non-Final Office Action for U.S. Appl. No. 12/251,648 mailed on Mar. 1, 2011, 25 pages.

Office Communication for U.S. Appl. No. 12/251,671 mailed on Feb. 9, 2011; 4 pages.

Office Action for U.S. Appl. No. 12/251,667 (Jan. 17, 2012).
Office Action for U.S. Appl. No. 12/251,685 (Jan. 9, 2012).
Office Action for U.S. Appl. No. 12/251,743 (Feb. 24, 2012).
Office Action for U.S. Appl. No. 12/485,763 (Feb. 3, 2012).
Notice of Allowance for U.S. Appl. No. 12/252,128 (Dec. 12, 2011).
Notice of Allowance for U.S. Appl. No. 12/485,759 (Dec. 19, 2011).
Notice of Allowance for U.S. Appl. No. 12/251,648 (Feb. 29, 2012).
Notice of Allowance for U.S. Appl. No. 12/251,731 (Apr. 2, 2012).
Notice of Allowance for U.S. Appl. No. 12/251,700 (Dec. 29, 2011).
Notice of Allowance for U.S. Appl. No. 12/485,766 (Nov. 9, 2011).

* cited by examiner

HEALTH METER

CROSS-REFERENCES TO RELATED APPLICATIONS

This application claims the benefit and priority under 35 U.S.C. 119 (e) of U.S. Provisional Application Ser. No. 60/981,456, filed 19 Oct. 2007, entitled DIAGNOSABILITY FRAMEWORK, the contents of which are herein incorporated by reference in their entirety for all purposes.

This application also incorporates by reference for all purposes the entire contents of the following related and commonly-assigned non-provisional applications, all filed concurrently with the present application:
(1) U.S. application Ser. No. 12/252,056 entitled DIAGNOSABILITY SYSTEM;
(2) U.S. application Ser. No. 12/251,648 entitled RULE-BASED ENGINE FOR GATHERING DIAGNOSTIC DATA;
(3) U.S. application Ser. No. 12/251,731 entitled GATHERING CONTEXT INFORMATION USED FOR ACTIVATION OF CONTEXTUAL DUMPING;
(4) U.S. application Ser. No. 12/251,743 entitled USER-TRIGGERED DIAGNOSTIC DATA GATHERING;
(5) U.S. application Ser. No. 12/251,661 entitled DIAGNOSTIC DATA REPOSITORY;
(6) U.S. application Ser. No. 12/251,667 entitled DIAGNOSABILITY SYSTEM: FLOOD CONTROL;
(7) U.S. application Ser. No. 12/251,671 entitled GATHERING INFORMATION FOR USE IN DIAGNOSTIC DATA DUMPING UPON FAILURE OCCURRENCE;
(8) U.S. application Ser. No. 12/251,700 entitled INTELLIGENT COLLECTION OF DIAGNOSTIC DATA FOR COMMUNICATION TO DIAGNOSIS SITE;
(9) U.S. application Ser. No. 12/251,685 entitled SCRUBBING AND EDITING OF DIAGNOSTIC DATA;
(10) U.S. application Ser. No. 12/251,711 entitled NON-INTRUSIVE GATHERING OF DIAGNOSTIC DATA USING ASYNCHRONOUS MECHANISMS;
(11) U.S. application Ser. No. 12/252,128 entitled HEALTH MONITOR.

BACKGROUND OF THE INVENTION

The present invention relates to system maintenance and diagnosis, and more particularly to techniques that provide a simple and easily understandable indicator identifying the health or status of a system.

In recent years, efforts have been made to improve the manageability of large software systems, such as an Oracle database (DB) system. As part of managing the software system, information related to performance, resource utilization, and reliability are typically collected for the software system and presented to a software system administrator, such as a database administrator (DBA) for a database product.

While the information collected is useful, the volume of the information poses challenges to the software system administrator. One challenge is being able to understand, comprehend, and prioritize the information in a timely manner. Due to the volume of information and difficulty in correlating the information, many times it is not possible for an administrator to quickly determine the status of a system without having to spend a lot of time in analyzing and wading through the collected information. The problem is further aggravated when multiple systems are being managed.

BRIEF SUMMARY OF THE INVENTION

Embodiments of the present invention provide techniques for indicating the status or health of a monitored system in a simple and summarized manner. In one embodiment, a health meter is displayed that displays a status value indicating the status or health of the monitored system. The status or health of the system as indicated by the health meter may be based upon one or more characteristics or perspectives (or components) of the monitored system, such as performance, resource utilization, reliability, availability, scalability, and the status values computed for the components.

According to an embodiment of the present invention, techniques are provided for determining a status of a system. A set of one or more components influencing the status of the system is identified. A status value for each component in the set of components is determined. The status value for each component represents a status for the component. A status value for the system is determined based upon the status values determined for the set of components and based upon a preconfigured set of rules. The status value for the system is selected from a set of preconfigured values. The status value determined for the system is output. The status value represents the status of the system.

According to an embodiment of the present invention, the set of components identified comprises at least one of performance, resource utilization, scalability, availability, and reliability.

According to an embodiment of the present invention, techniques are provided for determining a set of one or more issues influencing the status of the component. An impact level associated with each issue in the set of issues is determined. A status value for the component is calculated based on a preconfigured set of rules and based on the impact level associated with each issue. The status value for the component is selected from the set of preconfigured values.

According to an embodiment of the present invention, the preconfigured set of rules specify one or more rules for determining a status value for the system based upon the status value determined for each of the set of components.

According to an embodiment of the present invention, the preconfigured set of rules includes a weight factor indicating an equivalence relationship among the set of components. The set of preconfigured values comprises a WARNING value, a CRITICAL value, and a NORMAL value.

According to an embodiment of the present invention, the status value determined for the system is displayed. A set of one or more active issues are determined.

According to an embodiment of the present invention, the status value for the system is determined for a point of time or for a specific period of time.

According to an embodiment of the present invention, a lifetime associated to each issue in the set of issues is determined. The associated lifetime for each issue is user configurable.

The foregoing, together with other features, embodiments, and advantages of the present invention, will become more apparent when referring to the following specification, claims, and accompanying drawings.

DETAILED DESCRIPTION OF THE INVENTION

In the following description, for the purposes of explanation, specific details are set forth in order to provide a thorough understanding of the invention. However, it will be apparent that the invention may be practiced without these specific details.

Embodiments of the present invention provide techniques for indicating the status or health of a monitored system in a simple and summarized manner. In one embodiment, a health meter is displayed that indicates the status or health of the monitored system. The status or health of the system, as indicated by the health meter, may be based upon one or more characteristics or perspectives of the system, such as performance, resource utilization, reliability, availability, scalability etc. Each of these perspectives may be treated as a component that feeds or impacts the health meter for the system. Accordingly, the health meter for the monitored system may be modeled as a logical aggregation of one or more perspective components. A perspective component may in turn depend upon one or more sub-components. In one embodiment, the one or more sub-components that a perspective component depends upon may be one or more active issues influencing the status or health of that perspective component. In addition to the health meter for the overall system, a perspective component feeding or impacting the health meter for the system may have a corresponding component health meter representing the health or status of the individual perspective component.

Figure 1:
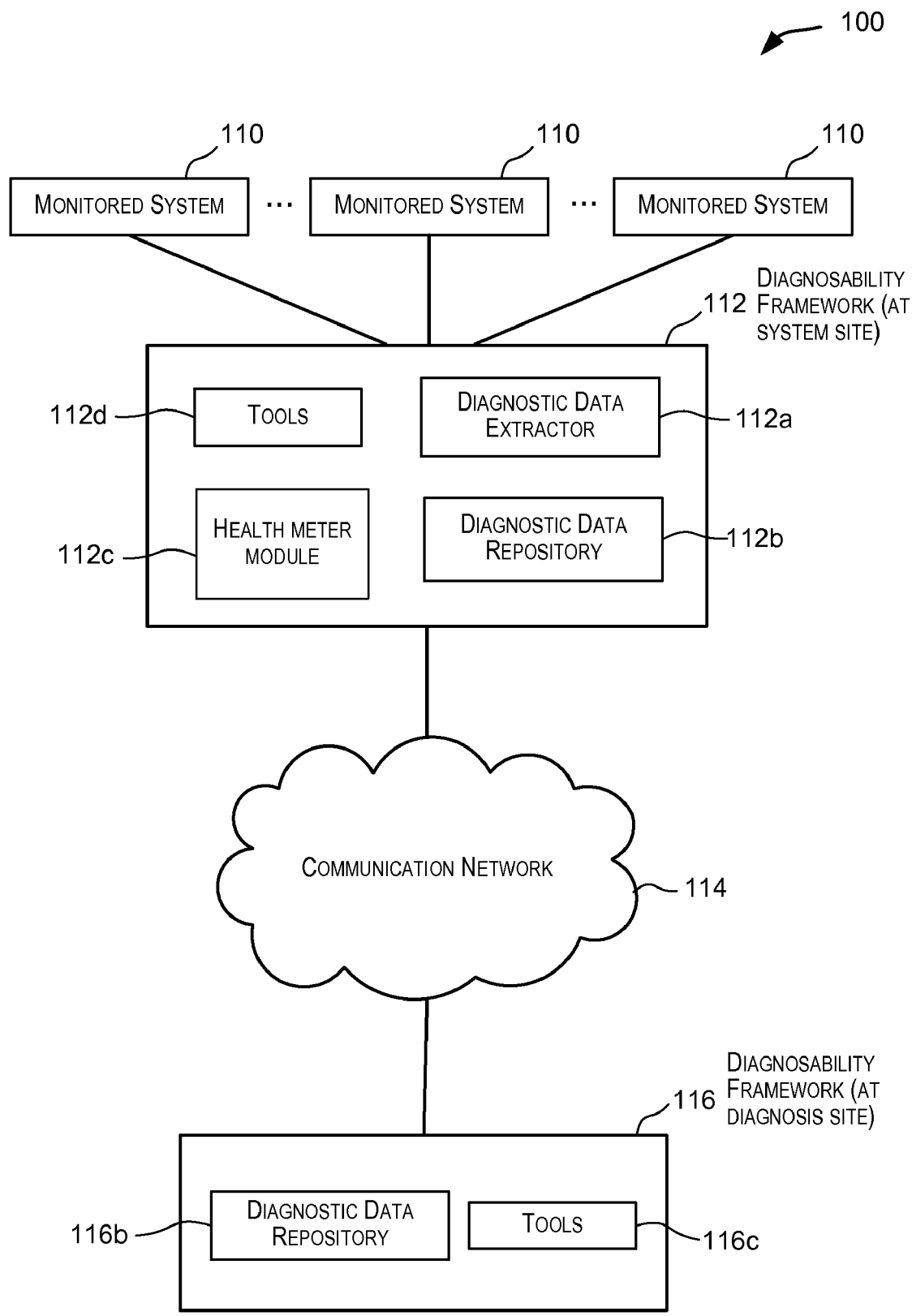
FIG. 1 is a simplified block diagram illustrating a diagnosability system according to an embodiment of the invention.

FIG. 1 is a simplified block diagram of a diagnosability system 100 according to an embodiment of the present invention. Diagnosability system 100 facilitates collection, storage, communication, and analysis of diagnostic data for or one or more monitored systems 110 (which may be different products or different instances of the same product). Monitored system 110 may be a software system, a hardware system, an enterprise system, and like. For example, monitored system 110 may be a complex enterprise software system such as a database system and related products provided by Oracle Corporation™ of California.

As depicted in FIG. 1, diagnosability system 100 comprises a diagnosability framework 112 deployed at a system site to provide diagnostic support for monitored system 110. Diagnosability system 100 also comprises a diagnosability framework 116 deployed at a diagnosis site. A diagnosis site may be, for example, a site of a vendor that is responsible for diagnosing problems that may occur in monitored system 110.

In a typical diagnostic workflow, diagnostic data is captured and stored for monitored system 110 by diagnosability framework 112. For example, diagnosability framework 112 may be configured to gather and store diagnostic data related to monitored system 110 when a condition is detected in monitored system 110. In one embodiment, the condition detected in monitored system may include an error detected in system 110. The diagnostic data collected and stored by diagnosability framework 112 may include, for example, trace data, diagnostic dumps, run reports, logs (e.g., error logs), results of diagnosability actions, and the like. Portions of the diagnostic data stored by diagnosability framework 112 may be communicated to diagnosability framework 116 located at the diagnosis site for analysis, such as failure analysis to identify and resolve root cause of the failures or errors. The diagnostic data may be communicated from diagnosability framework 112 to diagnosability framework 116 via a communication network 114. Communication network 114 may be any network capable of communicating data such as the Internet, an intranet, a switched network, and the like. Communication network 114 may include wired or wireless communication links. Various communication protocols may be used to communicate data from diagnosability framework 112 to diagnosability framework 116.

As depicted in FIG. 1, diagnosability framework 112 comprises a diagnostic data extractor (DDE) 12a, a diagnostic data repository (DDR) 112b, a health meter module 112c, and various tools 112d. The various components depicted in diagnosability framework 112 are merely examples of components that may be included in diagnosability framework 112. In alternate embodiments, diagnosability framework 112 may have less or more components than those shown. The components in diagnosability framework 112 may be implemented in software (e.g., code, program, instructions that are stored on a machine-readable medium and executed by a processor), hardware, or combinations thereof.

In one embodiment, DDE 112a may be configured to create an incident upon occurrence or detection of a condition in monitored system 110 and to provide a rule-based engine for determining all of the relevant diagnostic data to be gathered for the detected condition. In one embodiment, a condition detected in monitored system 110 may include an error detected in the monitored system. In this manner, DDE 112a instruments the generation of diagnostic data efficiently and effectively for a condition detected in the monitored system. Contextual information related to the detected condition may be provided to and used by DDE 112a to determine the targeted information to be dumped for the detected condition. In one embodiment, an incident may be generated only for a critical error detected in monitored system 110. In this embodiment, an incident represents a single occurrence of a critical error in system 110. An error in system 110 may be deemed as a critical error if the error is caused due to the working of system 110 itself as opposed to an error caused by a client or user's improper interaction with the system. A critical error may be an internal error, a system access violation, or some external errors detected in monitored system 110, such as an object no longer exists. Further information related to DDE 112a may be found in the applications incorporated by reference in the present application.

Diagnostic data repository (DDR) 112b (also sometimes referred to as ADR in the applications incorporated by reference in the present application) provides a centralized repository for storing diagnostic data related to monitored system 110 collected by diagnosability framework 112. The diagnostic data collected by diagnosability framework 112 may be stored in a structured format that enables searching and database-like querying capabilities. In one embodiment, DDR 112b is a file-based repository. Various different types of diagnostic data may be stored in DDR 112b such as traces, dumps, alert logs, health monitor reports, and the like. Information gathered and/or determined by health meter module 112c (e.g., the status value determined for a health meter for monitored system 110) may be stored or dumped into DDR 112b.

In one embodiment, DDR 112b is capable of storing diagnostic data for multiple monitored systems such as multiple monitored systems 110. The diagnostic data collected for each monitored system 110 may be stored under a separate directory (e.g., an ADR_HOME directory) allocated to that system. The ADR_HOME directories share a common structure to facilitate analysis of the stored data across multiple monitored systems 110. Multiple ADR_HOME directories may be present under a single ADR_BASE directory. In this manner, diagnostic data for multiple monitored systems 110 may be stored and organized in a consistent manner.

In one embodiment, the diagnostic data stored in DDR 112b may be tagged or annotated with metadata information. The metadata information may be used to find correlations between pieces of the diagnostic data stored in DDR 112b. The metadata also enables navigation of the diagnostic data stored in DDR 112b. The metadata may include one or more correlation keys. Further information related to DDR 112b and correlation keys may be found in the applications incorporated by reference in the present application.

Health meter module 112c is configured to perform processing for determining and displaying a health meter for monitored system 110 that indicates the status or health of system 110 in a simple and easy to understand manner. The status or health of system 110 as indicated by the health meter may be based upon one or more characteristics or perspectives of the system, such as performance, resource utilization, reliability, availability, scalability etc. Each of these perspectives may be treated as components that impact or influence the health meter for system 110. A perspective component may in turn depend upon one or more sub-components upon which the perspective component depends. In one embodiment, the one or more sub-components that a perspective component depends upon may be one or more issues influencing the status or health of the perspective component. In addition to the health meter for system 110, a perspective component influencing the system health meter may also have its own health meter representing the health or status of the individual perspective component. Health meter module 112c and its functions are discussed below in further details.

Various tools 112d may be provided as part of diagnosability framework 112. These tools may include tools for querying the diagnostic data stored in diagnostic data repository 112b, tools for generating reports, analysis tools, and other tools that use the diagnostic data collected by diagnosability framework 112. Further information regarding tools 112d can be found in the applications incorporated by reference in the present application.

As mentioned previously, the diagnostics data collected by diagnosability framework 112 may also be forwarded to diagnosability framework 116 located at a remote site (for example, the site of a software system vendor) for analysis. As depicted in FIG. 1, diagnosability framework 116 may comprise a diagnostic data repository 116b, and one or more tools 116c. The various components depicted in the diagnosability framework 116 are merely examples of components that may be included in the diagnosability framework. In alternate embodiments, diagnosability framework 116 may have less or more components than those shown in FIG. 1. The components depicted in diagnosability framework 16 may be implemented in software, hardware, or combinations thereof.

In one embodiment, diagnostic data repository 116b provides a repository for storing diagnostic data received from one or more system sites. In one embodiment, the structure of diagnostic data repository 116b is the same as the structure of diagnostic data repository 112b at system sites. This facilitates efficient storage and analysis of the data. In such an embodiment, data received from system site packages is stored in the same directory location in diagnostic data repository 116b as the data that was stored in diagnostic data repository 112b.

Various tools 116c may be provided in diagnosability framework 116 to help analyze the diagnostic data received from diagnosability framework 112 and to guide management and resolution of problems and errors in monitored systems. These tools may include command line or GUI-based tools for use by personnel at the diagnosis site. For example, the tools may include a tool that may be used to analyze the diagnostic data received from the software system site and to identify causes for the errors, tools for automatically routing the diagnostic data to a correct entity (e.g., a particular group or department responsible for the software that experienced the error, one or more software developers responsible for solving the error, a system administrator, etc.) for diagnosis, and the like.

It should be noted that the instant application focuses on health meter module 112c of diagnosability framework 112. Information related to the various other components of diagnosability system 100 may be found in the applications incorporated by reference in the present application.

Figure 2:
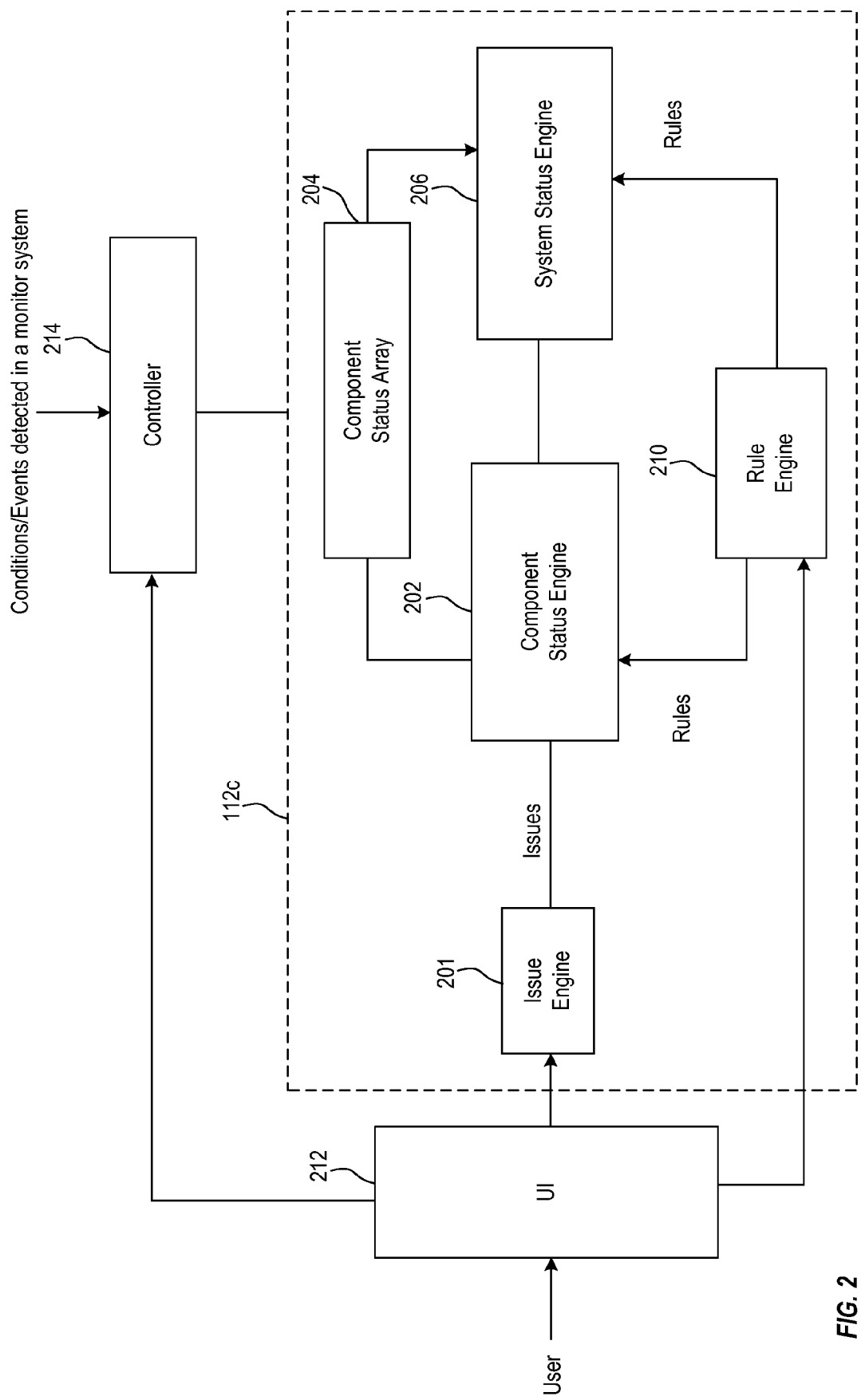
FIG. 2 is simplified block diagram depicting a health meter module according to an embodiment of the invention.

FIG. 2 is a simplified block diagram depicting health meter module 112c incorporating an embodiment of the present invention. The various components depicted in FIG. 2 are merely examples of components that may be included in health meter module 112c. In alternate embodiments, health meter module 112c may have less or more components than those shown in FIG. 2. The components depicted in FIG. 2 may be implemented in software, hardware, or combinations thereof.

Health meter module 112c is configured to perform processing for determining and outputting a health meter for monitored system 110. As part of the processing health meter module 112c is configured to determine an overall health or status of monitored system 110 by determining a status value for the system health meter that is indicative of the overall health or status for the monitored system. In one embodiment, the status value that is determined for the system health meter may be selected from a set of preconfigured status values (e.g., NORMAL, WARNING, CRITICAL). The health meter for monitored system 110 with the determined status value may then be output. The health meter thus identifies the health of monitored system 110 in a simple and summarized manner.

The status or health of monitored system 110, as indicated by the health meter for the monitored system, may be based upon one or more components or perspectives of the system. These perspectives or components may include, for example, performance of the system, resource utilization in the system, reliability of the system, availability of the system, scalability of the system, etc. The components affecting the overall health meter for a monitored system may change from one monitored system to another and may be user-configurable. A perspective component affecting the overall health meter for a monitored system may itself depend upon one or more sub-components or issues influencing the status or health of the perspective component, and so on. In this manner, a hierarchy of dependency may be configured for the purposes of calculating the status value for the health meter for monitored system 110.

As depicted in FIG. 2, the processing for determining and outputting a status value for a system health meter may be initiated in response to a user request to compute the system health meter via a user interface 212. The processing may also be initiated in response to various other events and/or conditions detected in the monitored system such as creation of a new incident in response to an error or failure in the monitored system, etc. Likewise, the processing for determining a status value for a component may be triggered in response to various different events. For example, the component status value processing may be initiated upon receiving a signal to determine a status value for the system health meter. A user may also specifically identify a particular component and request computation of a status value for that component via user interface 212.

A controller 214 may be provided and configured to activate health meter module 112c to carry out the required processing. The following describes the processing for determining a status value for a system health meter. As part of the processing, the processing for determining status values for the components impacting the system health meter is discussed first.

As depicted in FIG. 2, a component status engine 202 may be configured to compute a status value for a component. Component status engine 202 may receive information identifying a component for which a status value is to be computed. Component status engine 202 may then send a signal to an issue engine 201 to determine the issues influencing the component and information associated with the issues. The following describes the functions of issue engine 201 and the information associated with the issues.

When a status value is to be computed for a component or for a system health meter, issue engine 201 may be configured to determine all the issues influencing the component and information associated with the issues. An issue may correspond to an error, an access violation, a threshold violation, and the like occurring in the monitored system. The issues may be tracked and information for the issues may be collected and stored by diagnosability framework 112.

Figure 6:
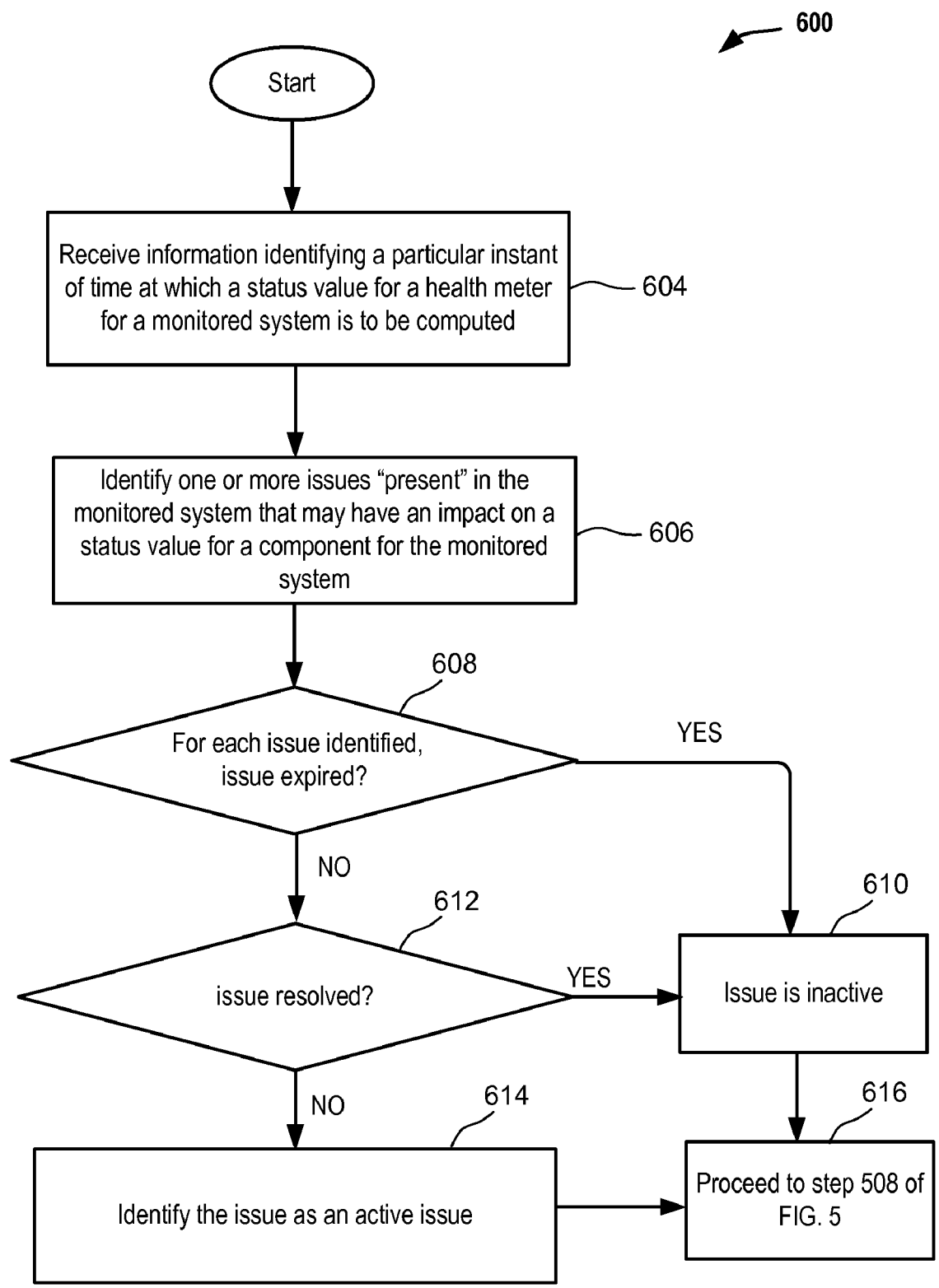
FIG. 6 is a simplified flow chart depicting a method for determining one or more active issues impacting the status of a component according to an embodiment of the present invention.

In one embodiment, an issue that impacts a component may have an associated impact lifetime. The impact lifetime associated with an issue may represent a time window within which the impact of the issue can be felt on the component and thereby may affect the status value determined for the component which in turn may affect the status value for the overall system health meter. In one embodiment, only active issues are considered for purposes of calculating the status value for the health meter for the monitored system or for a component. An issue is considered as an active issue if the impact lifetime for the issue has not expired or the issue has not been resolved at a time when the issue is to be used for status value computation (either for a component or for the overall health meter for the monitored system). FIG. 6, as will be explained later, illustrates a method for determining an active issue according to an embodiment of the present invention.

It is possible that an issue may have an infinite amount of lifetime, i.e., the issue's impact is always considered during the calculation of a status value, either for a component health meter or for the overall system health meter. These kinds of issues may always be taken into consideration when determining the status value for the component or the overall system until they are explicitly marked as closed/inactive or detected as resolved by the system. On the other hand, it may be the case that an issue has been resolved prior to its impact lifetime has expired. In such a case, the issue may be excluded when determining the status value for the component.

In one embodiment, one or more issues determined by issue engine 201 for a particular component may be excluded by a user when determining the status value for the health meter for the monitored system or for a component. In one embodiment, the impact lifetime associated for an issue is user configurable. Accordingly, a user may set the impact lifetime for an issue.

In addition to an associated impact lifetime, an issue identified by issue engine 201 may also have an associated impact value. The impact value associated with an issue for a component may be based upon the impact or degree of importance of that issue on the component. In one embodiment, the impact value associated with an issue may be one of three values: CRITICAL, WARNING, and NORMAL. In another embodiment, the impact value of an issue may be one of two values: LOW and HIGH.

A single issue may impact several different components. In such an embodiment, the impact of the single issue on the different components may be the same or may be different. Accordingly, the issue may have multiple associated impact values with each impact value corresponding to the impact of that issue on the different components. For example, the impact of an issue for the performance component may be HIGH whereas the impact of the same issue on the scalability component may be LOW. An issue affecting multiple components may also have multiple associated impact lifetimes corresponding to the different components. The impact value and impact lifetime associated with an issue are user configurable by a user (e.g., a DBA for a database system) via user interface 212.

After issue engine 201 determines all the issues influencing the component and information associated with the issues, including impact values for the issues for the specific computation, the information is sent to component status engine 202. Component status engine 202 may then use the determined issues and associated information for the issues to determine a status value for the component.

In one embodiment, component status engine 202 may compute the status value for the component based upon a preconfigured set of rules. Rules engine 210 may be configured to determine and communicate to component status engine 202 a set of one or more rules to be used by component status engine 202 for computation of a status value for a component. Component status engine 202 may then compute a status value for a component based upon information (e.g., issues and associated impact values for the issues) received from issue engine 201 and based upon the set of rules provided by rules engine 210.

According to an embodiment of the present invention, the preconfigured set of rules that are used for computation of a status value specify how the status value for the component is to be determined based upon the issues determined by the issue engine 201 and the impact values associated with the issues. These rules may define equivalence relations between the impact values for the issues, such as the equivalence relations between CRITICAL and WARNING issues. A WEIGHT FACTOR may be used to determine the equivalences. For example, a rule may specify a weight factor that is used to determine how many issues with associated WARNING impact value are equivalent to a CRITICAL issue, and so on. These rules, including the equivalence relationships and the weight factors, are user-configurable by a user (e.g., a DBA for a database system) via user interface module 212.

The status value for the component may be selected from a set of preconfigured values representing the health or status for that component, such as CRITICAL, WARNING, and NORMAL. In one embodiment, the set of values may be preconfigured for each component or a set of components impacting the overall health meter for the monitored system. In another embodiment, the set of values may be preconfigured for the whole monitored system. In such an embodiment, the status values for the overall health meter for the system and for health meters of the components affecting the overall health meter are selected from the set of preconfigured values for that system.

For example, in one embodiment, the preconfigured values set for the monitored system may include three values: NORMAL, WARNING, and CRITICAL. Further, the following rules and equivalence conditions may be defined for determining a status value for the component:
(1) If there are at least 4 CRITICAL issues impacting the component, then the status value for the component is considered to be CRITICAL;
(2) If there are at least 4 WARNING issues, then the status value for the component is considered to be WARNING.

The weight factor between WARNING and CRITICAL issues in this scenario is 2 since every 2 WARNING issues are equivalent to 1 CRITICAL issue. Using these rules, depending on the number of CRITICAL and WARNING issues impacting the component, the status value for the component may be computed accordingly. In one embodiment, a component health meter may be output for the component indicating the status value determined for the component. The component health meter, including the determined status value, may be displayed or output via user interface 212.

Given the rules discussed above, the status value for a component for different scenarios may be determined as shown in table 1 below. For the example scenarios described in Table 1, assume that:
A: Number of CRITICAL impact issues
B: Number of WARNING impact issues
C: Status value for the component.

TABLE 1

|  | A | B | C |
| --- | --- | --- | --- |
| Scenario 1 | 4 | 0 | CRITICAL |
| Scenario 2 | 0 | 4 | WARNING |
| Scenario 3 | 2 | 0 | WARNING |
| Scenario 4 | 1 | 2 | WARNING |
| Scenario 5 | 0 | 8 | CRITICAL |

In scenario 1, there are 4 CRITICAL issues and 0 WARNING issues impacting the component and accordingly the status value for the component, using the equivalence rules, is computed as CRITICAL. In scenario 2, there are 0 CRITICAL issues and 4 WARNING issues and as a result the status value for the component is computed as WARNING. For scenario 5, there are 8 WARNING issues and 0 CRITICAL issues—since 8 WARNING issues are equivalent to 4 CRITICAL issues, the status value for the component is computed as CRITICAL.

As previously indicated, the status value for the overall health meter for the monitored system may be determined based on the status values determined for components that impact the health meter for the monitored system. In one embodiment, system health meter engine 206 may be configured to compute a status value for the health meter for the monitored system based on the component status values determined by component status engine 202, as discussed above. In such an embodiment, system health meter engine 206 may send a signal to component status engine 202 to determine the status values for the components impacting the system health meter.

Since the health meter for the system may depend upon multiple components and status values may be computed for each of the components, a data structure may be provided for storing the status values computed for the individual components. In one embodiment, as depicted in FIG. 2, a status array 204 may be provided for storing the status values for the components. Each entry of array 204 may correspond to a component from the multiple components and store or reference a status value computed for that component that has been computed by component status engine 202. This array may then be used by system health meter engine 206 for computing a status value for the health meter for the monitored system.

System health meter engine 206 may use a set of preconfigured rules to determine the status value for the health meter for the overall system. Rules engine 210 may be configured to determine and provide to system health meter engine 206 a set of rules to be used for computing a status value for the health meter for the system. These rules may include equivalence rules and weight factors specifying how the status value for the health meter for the system is to be computed based upon the status values computed for components affecting the system health meter. For example, in one embodiment, a rule may be configured such that if any one of the component's status value is in CRITICAL state, then the status value for the overall health meter of the system is considered as CRITICAL too. Various rules may be configured for computing the status value for the overall health meter for system 110.

The status value that is determined for the health meter for system may be one that is selected from a set of preconfigured values with each value indicating a status or health of the monitored system. In one embodiment, the set of preconfigured values may comprise CRITICAL, WARNING, and NORMAL values. A CRITICAL value may indicate that the monitored system has critical problems and requires immediate attention; a WARNING value may indicate that the monitored system may have warning conditions and requires some but not so immediate attention from the system administrators as compared to a CRITICAL value; and a NORMAL value may indicate that the monitored system is operating normally and does not require attention. In such an embodiment, based upon the status values computed for the one or more components that impact the health meter for the monitored system, a single status value (such as a CRITICAL, WARNING, or NORMAL value) may be determined to represent the overall health of the monitored system. A health meter may be output for the monitored system indicating the status value determined for the monitored system. The health meter, including the determined status value, for the monitored system may be displayed via user interface 212.

The health meter for the system thus displays a status value representative of the health of the system. Since the status value is determined from a set of preconfigured status values, each having a specific meaning, the health meter provides a quick, simple, and meaningful way to gauge the health or status of a system (e.g., system 110). At any given point of time, the system administrator is able to determine whether the system require immediate attention, some attention or no attention at all, thus allowing timely resolution of failures or errors for the system. The single status value associated with the health meter for the system allows a system administrator to easily understand, comprehend, and prioritize actions to be performed for the monitored system in a timely manner.

Health meter module 112c, as discussed above, may be applicable to any system, including software, hardware, or hybrid systems. For example, a health meter may be determined and output for a monitored system including complex enterprise software dealing with many kinds of issues. A health meter may be provided for the entire software stack including applications, middleware, databases, etc.

Figure 3:
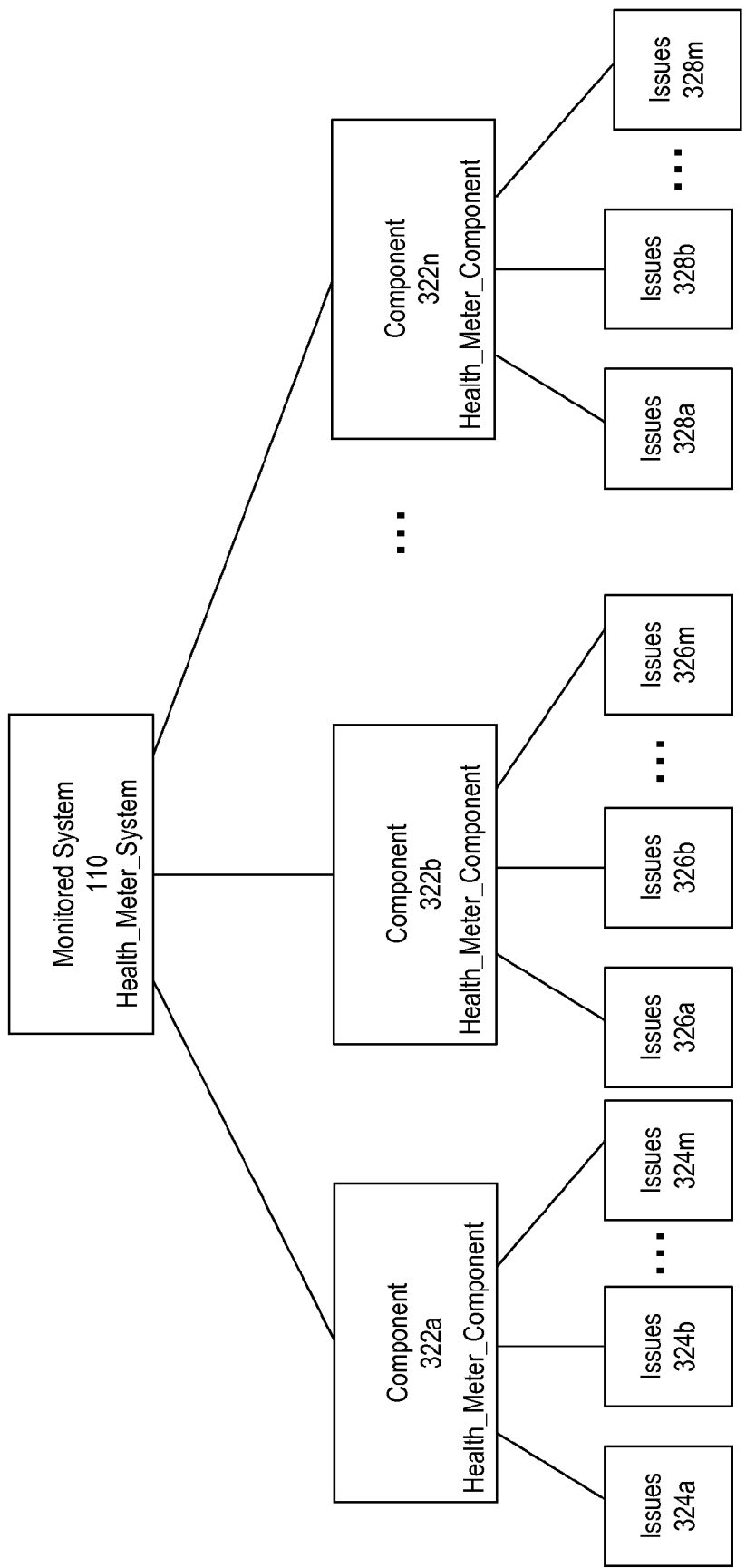
FIG. 3 is a simplified block diagram depicting a hierarchical relationship between a health meter for a monitored system, one or more components that impact the health meter for the monitored system, and one or more issues that impact each of the one or more components, according to an embodiment of the present invention.

FIG. 3 depicts a hierarchical relationship between a health meter for monitored system 110, the one or more components that impact/influence the health meter for monitored system 110, and the one or more issues that impact each of the one or more components, according to an embodiment of the present invention. FIG. 3 is merely illustrative of an embodiment incorporating the present invention and does not limit the scope of the invention as recited in the claims. One of ordinary skill in the art would recognize other variations, modifications, and alternative. For example, there may be more or fewer level of abstractions than those shown in FIG. 3.

As depicted in FIG. 3, the health meter for monitored system 110 is represented by reference Health_Meter_System. Health_Meter_System may be influenced by components 322a through 322n. These components may be, for example, performance, resource utilization, reliability, availability, scalability etc. In one embodiment, a status value for Health_Meter_System may be determined based upon the status values for components 322a through 322n and a set of preconfigured set of rules. For example, the status value for Health_Meter_System may be computed based upon the status values computed for components 322a through 322n and a set of preconfigured rules specifying equivalence relationships and the weight factors. As previously indicated, these rules may be user-configurable.

A component affecting Health_Meter_System may itself be impacted and depend upon one or more issues. For example, as depicted in FIG. 3, components 322a through 322n are influenced by one or more sub-components, represented as issues in FIG. 3. For example, in FIG. 3, component 322a is influenced by issues 324a through 324m. Accordingly, the status value for component 322a may be determined based upon issues 324a to 324m. In one embodiment, a status value for component 322a may be computed by component status engine 202 based upon the impact values determined for issues 324a to 324n and a set of preconfigured rules provided by rules engine 210 of FIG. 2. Likewise, component 322b is influenced by issues 326a through 326m. Accordingly, the status value for component 322b may be determined based upon issues 326a to 326n. In one embodiment, the status value for component 322b may be computed by the component status engine 202 of FIG. 2 based upon impact values determined for issues 326a to 326n and a set of preconfigured rules provided by rules engine 210 of FIG. 2, and so on. A single issue may impact more than one component. The rules that are used to compute the status value for one component may be the same as or different from the set of rules used to compute a status value for another component. These rules are user configurable. In one embodiment, a single set of rules may be configured for the system and used to determine the status values for the components.

A component may have its own health meter (represented by reference Health_Meter_Component in FIG. 3) that displays the status value determined for the component. These health meters for the individual components may be displayed or output to the user. The user is thus able to determine the status of the individual components based on the status value determined for the component.

As explained previously, the status value for each component may be a single value selected from a set of preconfigured values representing the status or health for that component, such as CRITICAL, WARNING, and NORMAL. Likewise, the status value for the health meter for the system may be a single value selected from a set of preconfigured values representing the status or health for the system, such as CRITICAL, WARNING, and NORMAL. In one embodiment, a set of values may be preconfigured for each component or the set of components, such as 322a through 322n. In another embodiment, a single set of values may be preconfigured for the whole monitored system.

Different techniques may be used to output the health meter information to the user. In one embodiment, a health meter for the monitored system may be displayed indicating the status value determined for the health meter. Drilldown functionality may be provided that enables a user to get more information related to the system. For example, selecting the health meter for the system (e.g., using an input device such as a mouse), may provide information on the components that impact the health meter for the system. The components impacting the system health meter may be output along with status values computed for the components. In this manner, the user is able to drill down to see the statuses of the components affecting the system health meter. The user may further drill down into a component to see information about the issues affecting the component. For example, selecting a particular component may display a list of issues impacting that component and the associated impact values.

Accordingly, the drilldown functionality may be used by a user to get information for the different hierarchical levels configured for a monitored system. The drilldown feature thus enables users such as system administrators to obtain a high level health status of the system as indicated by the system health meter, and if needed explore and get information at various levels (e.g., components or issues) of detail as desired by the users.

As mentioned earlier, a component affecting the system health meter may have its own component health meter. In one embodiment, an incident meter that corresponds to the reliability component may be provided to indicate the impact of one or more incidents resulting from errors in monitored system 110. A status value may be determined for the incident meter by component status engine 202 of FIG. 2 based upon the one or more incidents in monitored system 110, the impact values associated with the incidents, and a preconfigured set of rules specifying how the status value for the incident meter is to be determined. In one embodiment, the status value determined for the incident meter is a value selected from a set of pre-configured values, such as Warning, Critical, and Normal.

As mentioned previously, the processing for determining a status value for a component may be triggered in response to different events. For example, the computation of a status value for the incident meter may be triggered in response to the following events: (1) creation of a new incident in response to an error or failure in the monitored system; (2) update on an existing incident; (3) an existing incident is marked as resolved or purged; (4) an existing incident is aged out of its impact lifetime, and the like.

Figure 4:
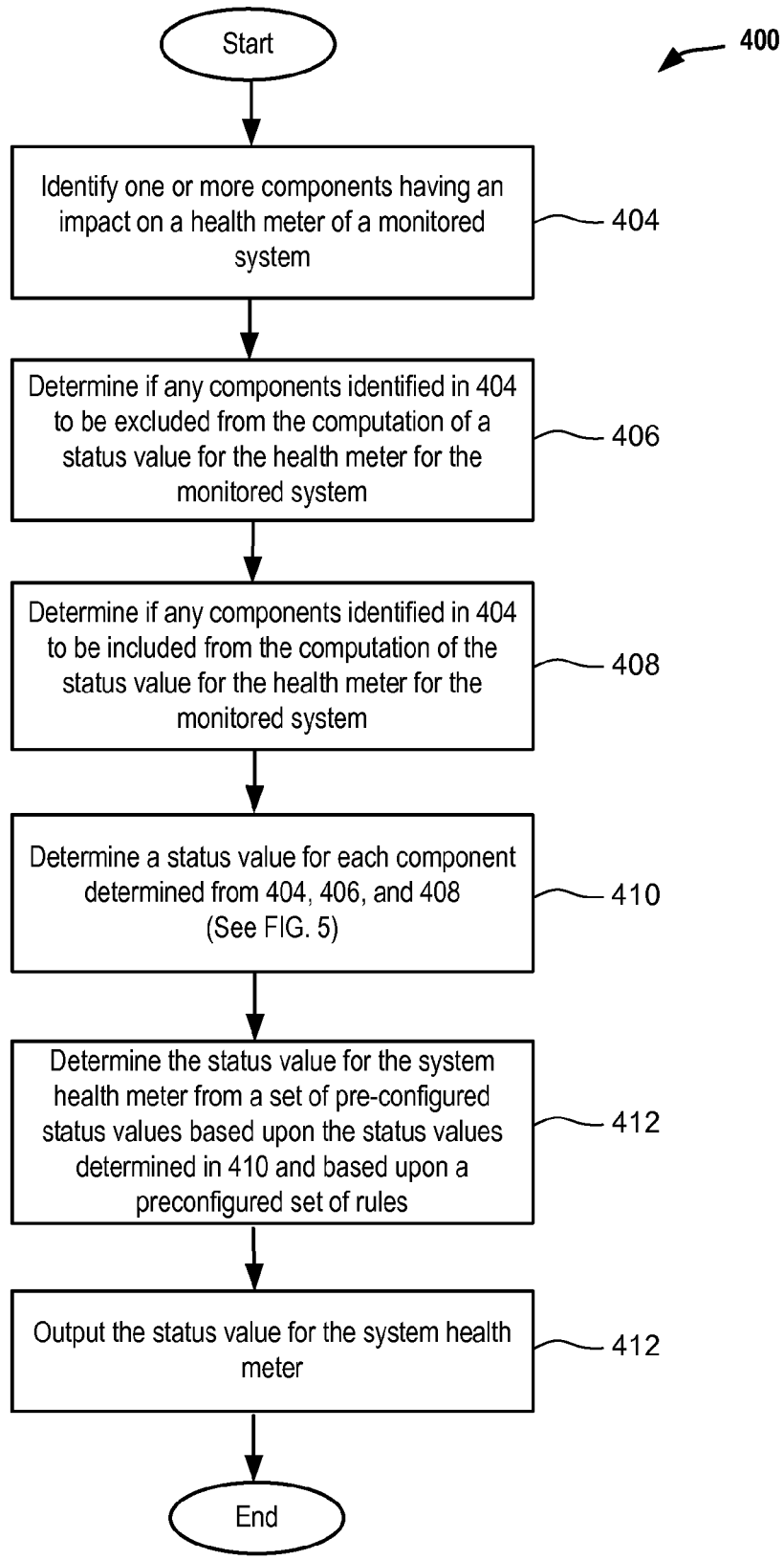
FIG. 4 is a simplified flow chart depicting a method for determining a status value for a health meter for a monitored system according to an embodiment of the present invention.

FIG. 4 shows a simplified flow chart 400 depicting a method for determining a status value for a health meter for a monitored system according to an embodiment of the present invention. The processing depicted in FIG. 4 may be performed by software (executed by a processor), hardware, or combinations thereof.

Referring to FIG. 4, at 404, one or more components impacting the status of a health meter for the monitored system are determined. In one embodiment, a user may exclude one or more components (which would otherwise be included in the computation) from being included in the computation of the status value for the health meter. Accordingly, at 406, a check is made to see of there are any components identified in 404 that are to be excluded from the computation of the status value for the system health meter. In one embodiment, one or more components may be specifically tagged to be included in the computation of the status value for the system health meter. Accordingly, at 408, a check is made to determine any components marked for inclusion in the computation of the health meter for the monitored system.

Figure 5:
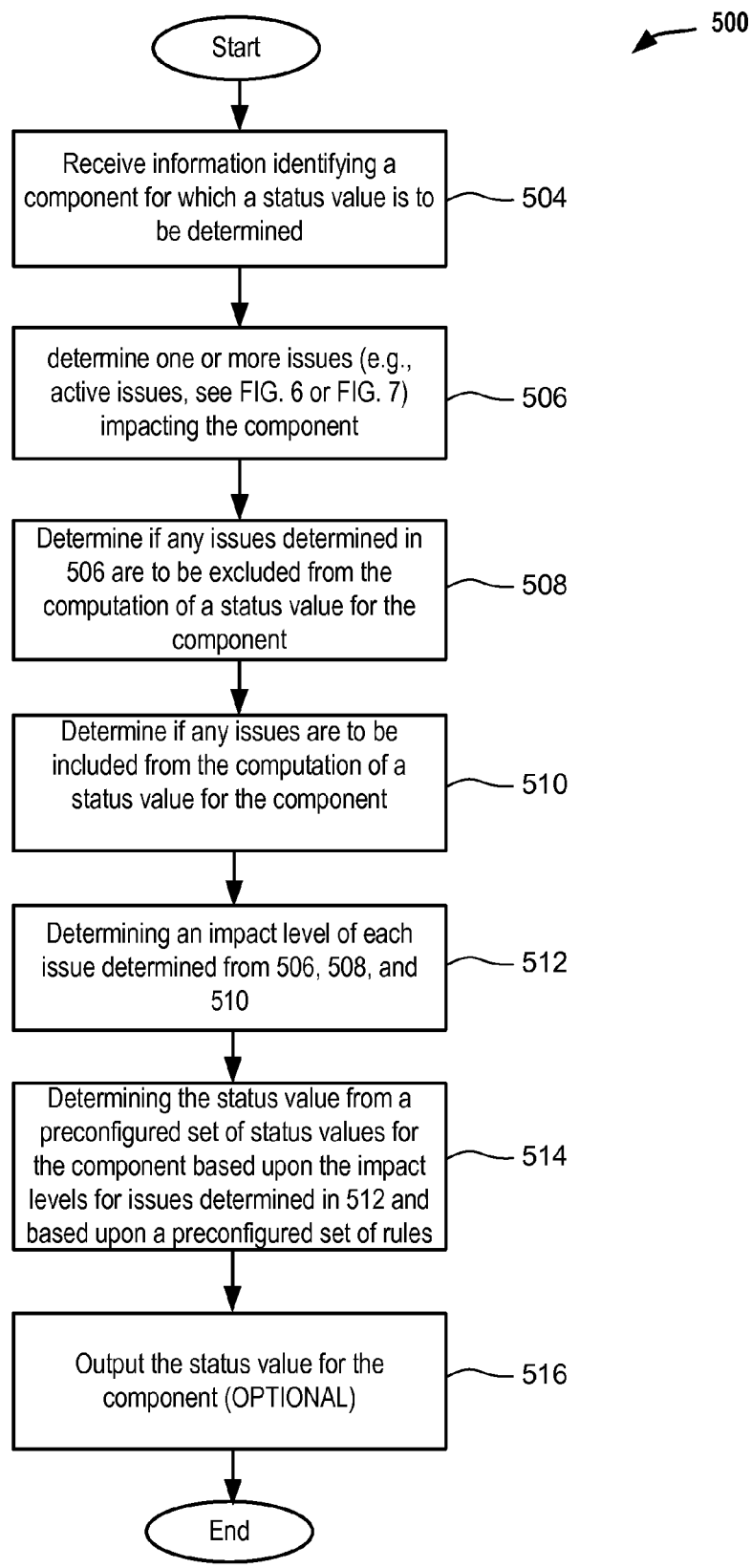
FIG. 5 is a simplified flow chart depicting a method for determining a status value for a component for a monitored system according to an embodiment of the present invention.

At 410, a status value is determined for each component that is to be used for the computation of the status value for the system health meter based upon processing performed in 404, 406, and 408. FIG. 5, as described below, depicts a method for determining a status value for a component according to an embodiment of the present invention. At 412, the status value for the health meter for the monitored system is determined based upon the status values determined in 410 and based upon a preconfigured set of rules. The preconfigured set of rules may include equivalence rules, weight factors, and other rules that specify how the status value for the system health meter is to be computed based upon the values for the components determined in 410. In one embodiment, the status value determined for the health meter for the system is a value selected from a set of pre-configured values, such as Warning, Critical, and Normal, for the system.

At 414, the status value determined in 412 may be output. For example, the system health meter may be displayed on an output device displaying the determined status value. The displayed status value determined in 412 represents the health or status of the monitored system. Different techniques may be used for displaying the health meter.

FIG. 5 shows a simplified flow chart 500 depicting a method for determining a status value for a component according to an embodiment of the present invention. The processing depicted in FIG. 5 may be performed by software (executed by a processor), hardware, or combinations thereof. The processing depicted in FIG. 5 may be performed in step 410 of FIG. 4.

Referring to FIG. 5, at 504, information is received identifying a component for which a status value is to be determined. At 506, one or more issues impacting the status of the component identified in 504 are determined. In one embodiment, only active issues are included in computing a status value for the component. An issue may be considered to be active if the issue's lifetime has not expired or the issue has not been resolved when the status value for the component is computed. FIG. 6, described below, illustrates one method to determine one or more active issues impacting the status of the component according to an embodiment of the present invention.

A user may specifically exclude certain issues from being included in the computation of the status value for the component. Accordingly, in 508, a check is made to see if any issues determined in 506 are to be excluded from the computation of a status value for the component.

A user may also tag specific issues to be included in the computation of a status value for a component. Accordingly, at 510, a check is made to identify any issues that are specifically tagged for inclusion in the computation of the status value for the component.

Based upon processing performed in 506, 508, and 510, a set of issues is determined that is to be used for computation of the status value for the component including issues identified in 506, excluding issues identified in 508, and including issues identified in 510. At 512, an impact value is determined for each of the one or more issues determined to be used for the computation of the status value for the component.

At 514, a status value for the component identified in 504 is determined based upon the impact values determined in 512 for the one or more issues and based upon a preconfigured set of rules. As explained previously, the preconfigured set of rules may include equivalence rules, weight factors, and other information specifying how the status value for the component is to be calculated based upon the impact values determined for the one or more issues associated with the component. In one embodiment, the status value determined in 514 is a value selected from a set of pre-configured values, such as Warning, Critical, and Normal.

At 516 (an optional step), the status value determined in 514 may be output. For example, a health meter for the component identified in 504 may be output that displays the status value determined in 514. The displayed status value determined in 514 represents the health or status of the component identified in 504. Different techniques may be used for displaying the component health meter.

FIG. 6 is a simplified flow chart depicting a method 600 for determining one or more active issues impacting the status of a component for purposes of calculating a health meter for a monitored system according to an embodiment of the present invention. The processing depicted in FIG. 6 may be performed by software (executed by a processor), hardware, or combinations thereof. The processing depicted in FIG. 6 may be performed in step 506 of FIG. 5.

Referring to FIG. 6, at 604, information is received identifying a point of time is at which a status value for a health meter for a monitored system is to be computed. At 606, information is determined that identifies one or more issues "present" in the monitored system that impact the status value for the component. In one embodiment, "present" refers to an issue that occurs prior to or simultaneously as the point of time chosen at 604. Accordingly, any issue that occurs after the time chosen in 604 will not be considered "present" for purpose of calculating the status value for a health meter for the monitored system.

As mentioned previously, an issue may have an associated lifetime representing the period of time when the issue influences the status of a component in a monitored system. The effect of the issue on the status of the component is lost after the lifetime associated with the issue has expired. Accordingly, at 608, for each issue identified in 606, it is determined if the lifetime associated with the issue has expired relative to the point of time chosen at 604. If it is determined at 608 that the lifetime associated with the issue has expired, then at 610, the issue is considered as an inactive issue and thus will not be considered in the computation for the status value for the component. Otherwise, at 612, for each issue identified in 606 and whose lifetime has not expired before the time chosen at 604, a check is made to determine if the issue has been resolved before the time chosen at 604. If the issue has been resolved, then according to 610, the issue is considered as an inactive issue. Otherwise, at 614, the issue is considered as an active issue for purposes of calculating the status value for a health meter for the monitored system. The processing then returns to step 508 of FIG. 5.

Figure 6A:
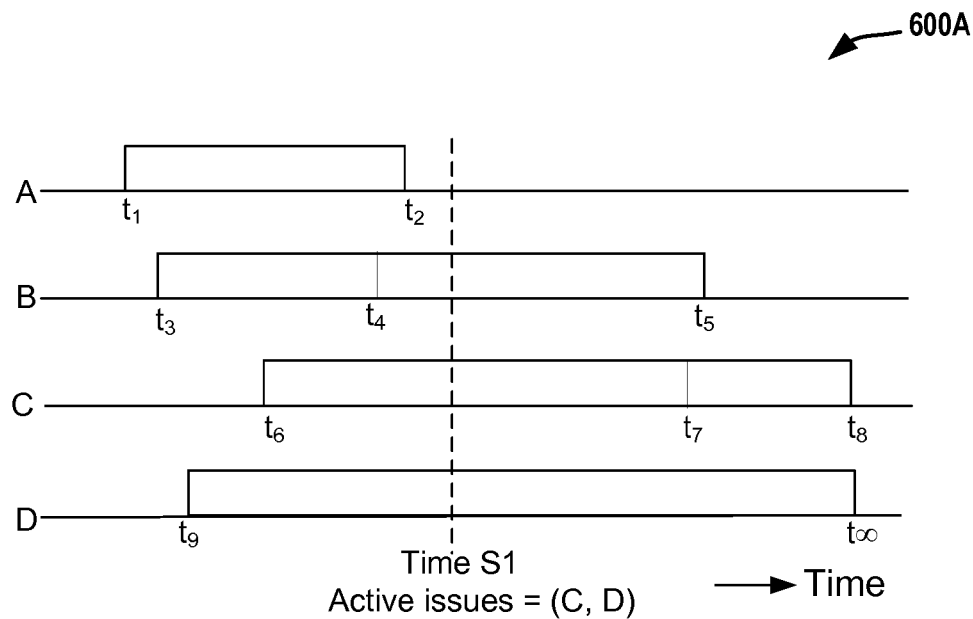
FIG. 6A is a timing diagram depicting the determination of one or more active issues impacting the status of a component according to an embodiment of the present invention.

FIG. 6A is a timing diagram 600A showing an example illustrating determination of one or more active issues according to an embodiment of the present invention. For the example depicted in FIG. 6A, it is assumed that a status value for the system health meter is to be computed at time S1.

Referring to FIG. 6A, letters A, B, C, and D represent issues that are present in the monitored system. The timing diagram for "A" depicts an issue A that occurs at time t1 and expires at time t2. Accordingly, the lifetime associated with issue A is from time t1 to t2. Timing diagram for "B" depicts an issue B that occurs at time t3 and expires at time t5. Accordingly, the lifetime associated with issue B is from time t3 to t5. In addition, timing diagram "B" also shows that issue B is resolved at time t4 before the issue's lifetime expires at time t5. As mentioned previously, an issue may be resolved prior to its lifetime expiration. In such a case, the issue may be excluded when determining the status value for the component. Likewise, timing diagram for "C" illustrates an issue C having an associated lifetime from time t6 to time t8. Issue C has been resolved at time t7 before its associated lifetime expires at time t8. Timing diagram for "D" illustrates an issue D that occurs at time t9 but expires at time too representing an infinite amount of lifetime associated with the issue. Issues with an infinite lifetime are always be taken into consideration when determining the status value for the component until they are marked explicitly as closed or detected as resolved by the system or explicitly excluded from the computation.

Since issues A, B, C, and D all occur before time S1, these issues are considered "present" in the monitored system and are eligible for computation of the status value for a component at time S1. As depicted in FIG. 6A, issue A is not considered as an active issue since issue A has expired when the health meter for the monitored system is computed at S1. Issue B is not considered as an active issue since issue B has been resolved before time S1, even though issue B's lifetime has not expired relative to time S1. Issue C is considered as an active issue and thus will be included in such a computation since issue C has neither expired nor been resolved when the health meter for the monitored system is computed at S1. Issue D is also considered as an active issue and thus will be included in such a computation since issue D has an infinite amount of lifetime and has not been resolved at time S1. Thus, in the example depicted in FIG. 6A, only issues C and D are considered active and included in computing the status value for the component for purpose of calculating a health meter for a monitored system.

It should be noted that the issues A, B, C, and D are merely examples of issues that may affect the status for a component for purpose of calculating a health meter for a monitored system. In alternate embodiments, there may be more or less issues than those shown in FIG. 6A that may impact the status of the component. In addition, the lifetime associated with each issue depicted in FIG. 6A may be configurable to suit the needs of customers/users.

FIGS. 6 and 6A describe a method to determine one or more active issues when the status value for the system health meter is computed for a particular point of time. Alternatively, a user may be interested in the status of the monitored system for a specific period of time, e.g., an arbitrary time window from time S1 to time S2. Since the status of the monitored system for a specific period of time may depend upon one or more active issues impacting the status of a component in that specific period of time, FIG. 7 thus depicts a method 700 for determining one or more active issues impacting the status of a component for purposes of calculating a status value for a health meter for a monitored system for a specific period of time according to an embodiment of the present invention.

Figure 7A:
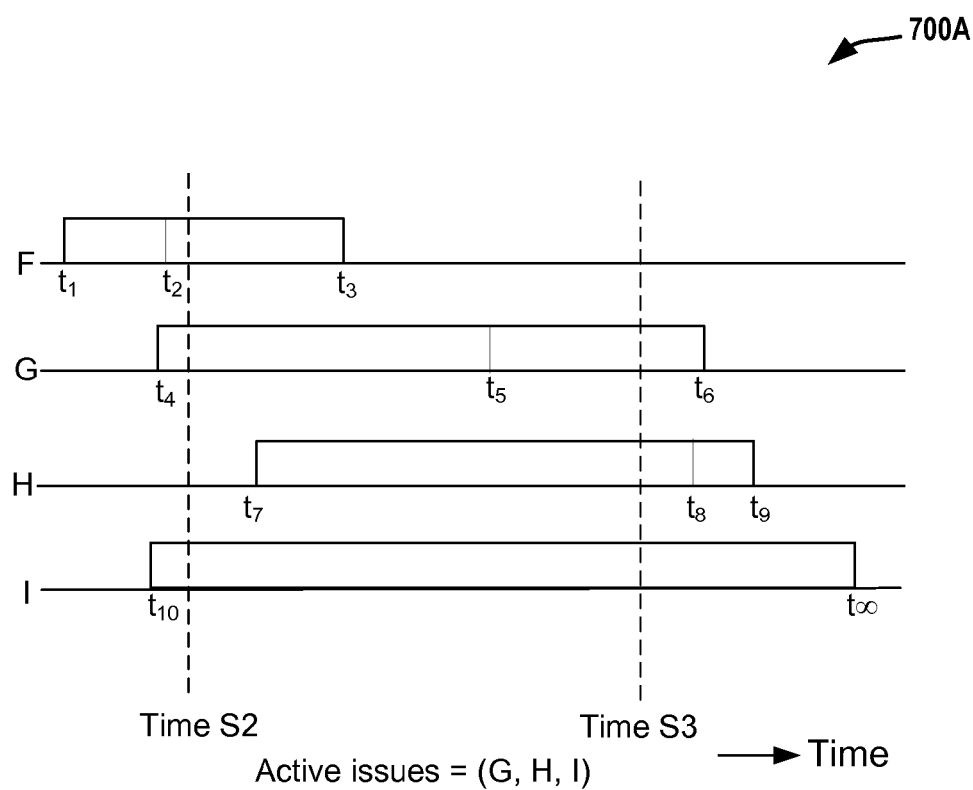
FIG. 7A is a timing diagram depicting the determination of one or more active issues impacting the status of a component according to an embodiment of the present invention.
Figure 7:
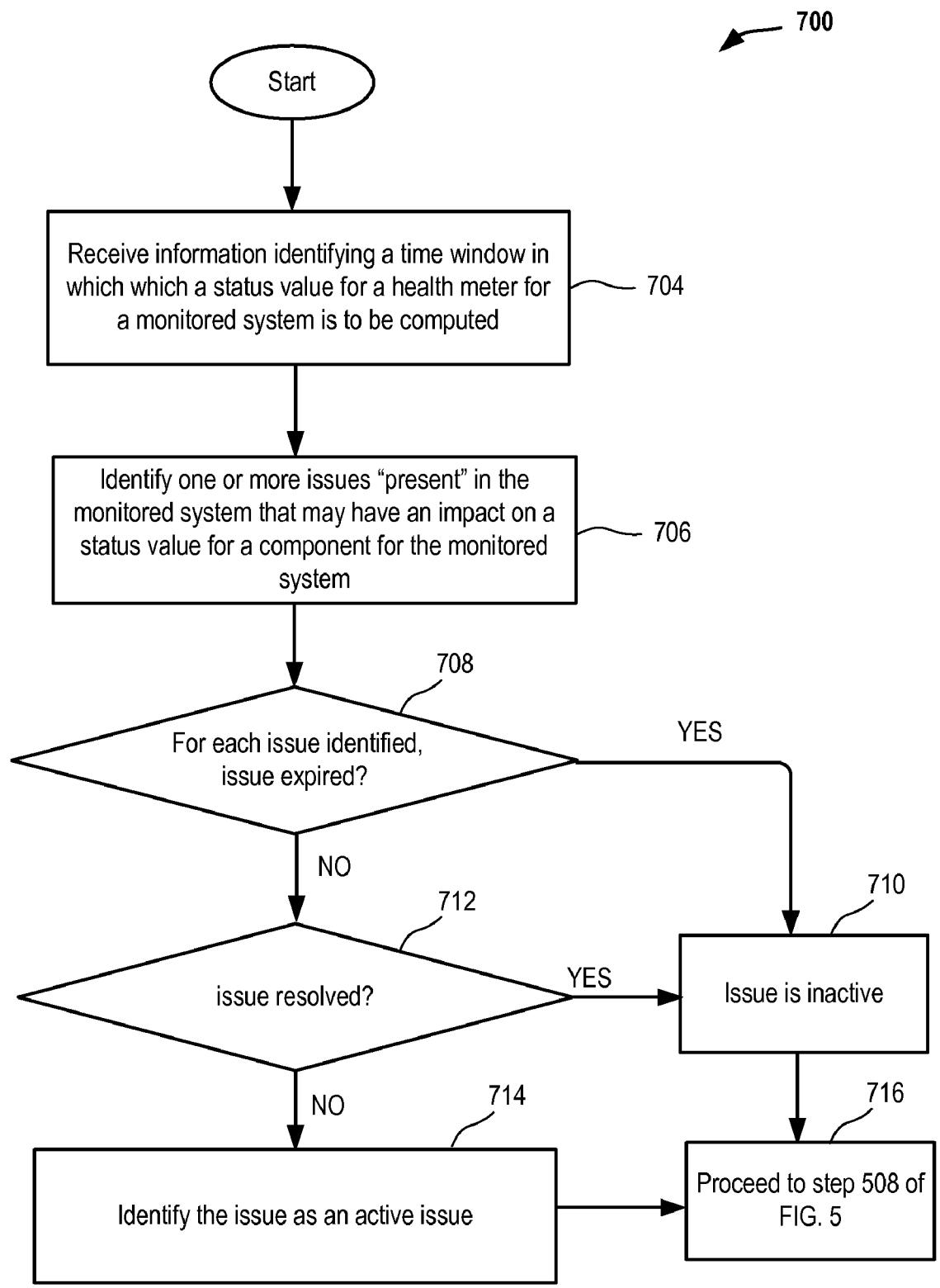
FIG. 7 is a simplified flow chart depicting a method for determining one or more active issues impacting the status of a component according to an embodiment of the present invention.

The processing depicted in FIG. 7 may be performed by software (executed by a processor), hardware, or combinations thereof. Method 700 depicted in FIG. 7 is similar to method 600 depicted in FIG. 6 in many aspects. Therefore, the following discussion mainly focuses on the differences between the two methods.

Referring to FIG. 7, at 704, information is received identifying a time window for which a status value for a health meter for a monitored system is to be computed. At 706, one or more issues "present" in the monitored system are identified. In one embodiment, "present" means that an issue occurs before or within the arbitrary time window chosen in 704. Accordingly, any issue that occurs after the time window chosen in 704 is not considered "present" for purpose of calculating the status value for a health meter for the monitored system.

At 708, for each issue identified in 706, it is determined if the lifetime associated with the issue has expired relative to the time window chosen at 704. If the lifetime associated with the issue has expired relative to the time window chosen at 704, then at 710, the issue is considered as an inactive issue and not considered in the computation for the status value for the component. Otherwise, at 712, a check is made to see if the issue has been resolved before the time window chosen at 704. If the issue has been resolved before the window chosen in 704, then according to 710, the issue is considered as an inactive issue. Otherwise, at 714, the issue is considered as an active issue for purpose of calculating the status value for a health meter for the monitored system. The processing then returns to step 508 of FIG. 5

FIG. 7A is a timing diagram 700A depicting an example of how one or more active issues impacting the status of a component for a monitored system for a specific period of time are determined according to an embodiment of the present invention. For the example depicted in FIG. 7A, it is assumed that the specific period of time that is chosen for purpose of calculating the status value for a health meter for the monitored system is from time S2 to time S3 as depicted in FIG. 7A.

Referring to FIG. 7A, letters F, G, H, and I represent issues that are present in the monitored system. Timing diagram for "F" depicts an issue F that occurs at time t1 and has an associated lifetime that expires at time t3. Issue F is resolved at time t2. Since issue F occurs before the time window from time S2 to time S3, issue F is considered "present" in the monitored system. However, issue F is not an active issue for purpose of calculating the status value for a health meter for the monitored system since issue F has been resolved before the time window from time S2 to time S3. Timing diagram for "G" depicts an issue G that occurs at time t4, expires at time t6, and is resolved at time t5. Issue G is considered to be both "present" and an active issue for purpose of calculating the status value for a health meter for the monitored system since issue G has not been resolved until time t5, and is thus active within the time window from time S2 to time S3. Timing diagram for "H" depicts an issue H that occurs at time t7, is resolved at time t8, and expires at time t9. Issue H is considered to be both "present" and an active issue for purpose of calculating the status value for a health meter for the monitored system since issue H is active within the time window from S2 to S3 and has not been resolved until time t8, which is at a later point of time beyond the time window from time S2 to time S3. Timing diagram for "I" depicts an issue I that occurs at time t10, but expires at time t∞ indicating an infinite amount of lifetime associated with issue I. As such, issue I is both "present" and an active issue for purpose of calculating the status value for a health meter for the monitored system since the impact of issue I has been felt on the monitored system for an infinite amount of time beyond the time window from S2 to S3. Therefore, the active issues in the example depicted in FIG. 7A are issues G, H, and I. These active issues will be included in computing the status value for the component for purpose of calculating a health meter for a monitored system for the time period S2 to S3.

It should be noted that the issues F, G, H, and I are merely examples of issues that may affect the status for a component for a monitored system for a specific period of time. In alternate embodiments, there may be more or less issues than those shown in FIG. 7A that may impact the status of the component. In addition, the lifetime associated with each issue depicted in FIG. 7A may be configurable to suit the needs of customers/users.

As mentioned previously, a health meter may be displayed that indicates the status or health of a monitored system. In one embodiment, two modes are provided for displaying the health/status of the system. In a "current" mode, the health meter for the system displays the status/health of the system for only a specific period of time, e.g., for the last one hour. The period of time may be user-configurable and may be set to some default value such as the last one hour. Accordingly, the health meter displayed in the current mode shows the health of the monitored system for the preconfigured time window. This helps to segregate old known health issues from recent ones (e.g., within the last one hour). The current mode also ensures that administrators are aware of short-lived transient issues, which may be resolved automatically by the system over a period of time.

In a "comprehensive" mode, the health meter for the system displays the status/health of the system at a particular point of time, wherein the status/health of the system is a representation of the impact of all active issues whose impact lifetimes have not expired or who have not been resolved at the time of calculations. For example, consider a database system affected with data corruption. Comprehensive mode will reflect the impact of this issue until it is resolved, whereas the current mode only reflects the impact of the issues for a specific period of time, e.g., the last one hour.

Figure 8:
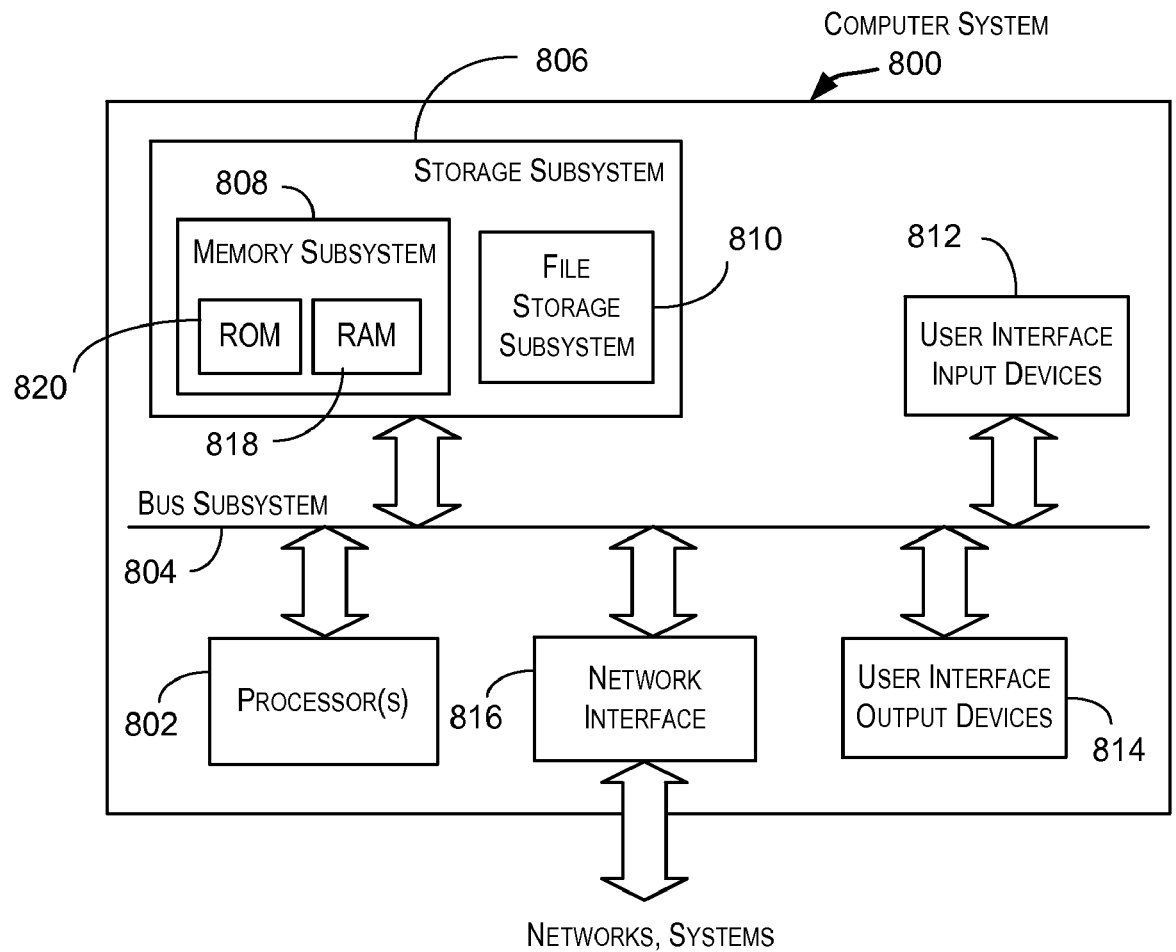
FIG. 8 is a simplified block diagram of a computer system that may be used to practice an embodiment of the various inventions described in this application.

FIG. 8 is a simplified block diagram of a computer system 800 that may be used to practice an embodiment of the various inventions described in this application. Computer system 800 may serve as the platform for the various components of the diagnosability system 100 depicted in FIG. 1. As shown in FIG. 8, computer system 800 includes a processor 802 that communicates with a number of peripheral subsystems via a bus subsystem 804. These peripheral subsystems may include a storage subsystem 806, comprising a memory subsystem 808 and a file storage subsystem 810, user interface input devices 812, user interface output devices 814, and a network interface subsystem 816.

Bus subsystem 804 provides a mechanism for letting the various components and subsystems of computer system 800 communicate with each other as intended. Although bus subsystem 804 is shown schematically as a single bus, alternative embodiments of the bus subsystem may utilize multiple busses.

Network interface subsystem 816 provides an interface to other computer systems, networks, and portals. Network interface subsystem 816 serves as an interface for receiving data from and transmitting data to other systems from computer system 800. For example, for the diagnosability framework deployed at the customer site or site where the software system is deployed, network interface subsystem 816 may be configured to transfer diagnostic packages from the customer site to the vendor or diagnosis site.

User interface input devices 812 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 800.

User interface output devices 814 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 800.

Storage subsystem 806 provides computer-readable storage medium that may be configured to store the basic programming and data constructs that provide the functionality of the present invention. Software (code modules or instructions) that provides the functionality of the present invention may be stored in storage subsystem 806. These software modules or instructions may be executed by processor(s) 802. Storage subsystem 806 may also provide a repository for storing data used in accordance with the present invention such as the diagnostic data repository. Storage subsystem 806 may comprise memory subsystem 808 and file/disk storage subsystem 810.

Memory subsystem 808 may include a number of memories including a main random access memory (RAM) 818 for storage of instructions and data during program execution and a read only memory (ROM) 820 in which fixed instructions are stored. File storage subsystem 810 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 800 can be of various types including a personal computer, a portable computer, a workstation, a network computer, a mainframe, a kiosk, a server or any other data processing system. Due to the ever-changing nature of computers and networks, the description of computer system 800 depicted in FIG. 8 is intended only as a specific example for purposes of illustrating the preferred embodiment of the computer system. Many other configurations having more or fewer components than the system depicted in FIG. 8 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps. While the embodiments of the diagnosability framework have been described as providing diagnostic support for software product instances, in alternative embodiments, embodiments of the present invention may be used for providing diagnostic support for software products, hardware products, or products having combination of software and hardware.

Further, while the present invention has been described using a particular combination of hardware and software, it should be recognized that other combinations of hardware and software are also within the scope of the present invention. The present invention may be implemented using hardware, software, or combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the inventions.

What is claimed is:

1. A method for determining a status of a system, comprising:
    identifying a set of one or more components influencing the status of the system;
    determining a status value for each component in the set of components, the status value for each component representing a status for the component;
    determining a status value for the system based upon the status values determined for the set of components and based upon a preconfigured set of rules, wherein the status value for the system is selected from a set of preconfigured values; and
    outputting the status value determined for the system, the status value representing the status of the system,
    wherein the status value for the system is determined for a point of time or for a period of time.

2. The method of claim 1 wherein identifying the set of one or more components comprises identifying at least one of a performance component, a resource utilization component, a scalability component, an availability component, or a reliability component.

3. The method of claim 1 wherein determining a status value for each component in the set of components comprises:
    determining a set of one or more issues influencing the status of the component;
    determining an impact level associated with each issue in the set of issues determined, wherein the impact level associated with each issue represents an impact of the issue on the component;
    calculating the status value for the component based on the impact level associated with each issue and based on a preconfigured set of rules, wherein the status value for the component is selected from the set of preconfigured values.

4. The method of claim 3 wherein determining the set of one or more issues influencing the status of the component comprises identifying a set of one or more incidents representing one or more errors in the system.

5. The method of claim 3 further comprising determining a lifetime associated with each issue in the set of one or more issues influencing the status of the component, wherein the lifetime associated with each issue is user configurable.

6. The method of claim 3 wherein determining the set of one or more issues influencing the status of the component comprises determining a set of one or more active issues.

7. The method of claim 6 wherein determining the set of one or more active issues comprises determining whether a lifetime associated with each issue in the set of one or more issues influencing the status of the component has expired when the status value for the system is to be computed.

8. The method of claim 6 wherein determining the set of one or more active issues comprises determining whether an issue in the set of one or more issues influencing the status of the component has been resolved when the status value for the system is to be computed.

9. The method of claim 1 wherein the preconfigured set of rules specify one or more rules for determining the status value for the system based upon the status value determined for each of the set of components.

10. The method of claim 9 wherein the preconfigured set of rules includes a weight factor indicating an equivalence relationship among the set of components.

11. The method of claim 1 wherein the set of preconfigured values comprises a WARNING value, a CRITICAL value, and a NORMAL value.

12. The method of claim 1 further comprising displaying the status value determined for the system.

13. A computer-readable storage medium storing a plurality of instructions for controlling a processor to determine a status of a system, the plurality of instructions comprising:
    instructions that cause the processor to identify a set of one or more components influencing the status of the monitored system;
    instructions that cause the processor to determine a status value for each component in the set of components, the status value for each component representing a status for the component;
    instructions that cause the processor to determine a status value for the system based upon the status values determined for the set of components and based upon a preconfigured set of rules, wherein the status value for the system is selected from a set of preconfigured values,
    wherein the instructions that cause the processor to determine a status value for the system comprise instructions that cause the processor to determine the status value for the system for a point of time or for a specific period of time; and
    instructions that cause the processor to output the status value determined for the system, the status value indicating the status of the system.

14. The computer readable storage medium of claim 13 wherein the preconfigured set of rules specify one or more rules for determining the status value for the system based upon the status value determined for each of the set of components.

15. The computer readable storage medium of claim 13 wherein the set of components includes at least one of a performance component, a resource utilization component, a scalability component, an availability component, or a reliability component.

16. The computer readable storage medium of claim 13 wherein the instructions that cause the processor to determine a status value for each component in the set of components further comprise:
    instructions that cause the processor to determine a set of one or more issues influencing the status of the component;
    instructions that cause the processor to determine an impact level associated with each issue in the set of issues, wherein the impact level associated with each issue represents an impact of the issue on the component; and instructions that cause the processor to calculate the status value for the component based on the impact level associated with each issue and based on a preconfigured set of rules, wherein the status value for the component is selected from the set of preconfigured values.

17. The computer readable storage medium of claim 16 wherein the instructions that cause the processor to determine the set of one or more issues influencing the status of the component further comprise instructions that cause the processor to determine a set of active issues.

18. The computer readable storage medium of claim 17 wherein the instructions that cause the processor to determine a set of active issues comprise instructions that cause the processor to determine whether a lifetime associated with each issue in the set of one or more issues influencing the status of the component has expired when the status value for the system is to be computed.

19. A system comprising:
   a memory; and
   a processor coupled to the memory;
   wherein the processor is configured to:
   identify a set of one or more components influencing a status of a monitored system;
   determine a status value for each component in the set of components, the status value for a component representing a status for the component;
   determine a status value for the system based upon the status values determined for the set of components and based upon a preconfigured set of rules, wherein the status value for the system is selected from a set of preconfigured values, and
   wherein the preconfigured set of rules specifies one or more rules for determining the status value for the monitored system based upon the status value determined for each of the set of components; and
   display the status value determined for the system, the status value indicating the status of the system.

20. The system of claim 19, wherein the status value for the monitored system is determined for a point of time or for a period of time.

* * * * *

UNITED STATES PATENT AND TRADEMARK OFFICE
CERTIFICATE OF CORRECTION

| | | |
|---|---|---|
| PATENT NO. | : 8,271,417 B2 | Page 1 of 1 |
| APPLICATION NO. | : 12/252070 | |
| DATED | : September 18, 2012 | |
| INVENTOR(S) | : Kuchibhotla et al. | |

It is certified that error appears in the above-identified patent and that said Letters Patent is hereby corrected as shown below:

On sheet 8 of 9, in figure 7, Reference Numeral 704, line 2, delete "which which" and insert -- which --, therefor.

In column 4, line 39, delete "12a," and insert -- 112a, --, therefor.

In column 13, line 19, delete "of" and insert -- if --, therefor.

In column 16, line 38, delete "FIG. 5" and insert -- FIG. 5. --, therefor.

Signed and Sealed this
Eighteenth Day of December, 2012

David J. Kappos
*Director of the United States Patent and Trademark Office*